(12) United States Patent
Jia et al.

(10) Patent No.: US 9,990,766 B2
(45) Date of Patent: Jun. 5, 2018

(54) METHOD AND SYSTEM FOR PREDICTING COLLISION PROBABILITY OF SPACE OBJECTS VIA GRAPHICS PROCESSING UNIT

(71) Applicant: Intelligent Fusion Technology, Inc, Germantown, MD (US)

(72) Inventors: Bin Jia, Germantown, MD (US); Kui Liu, Germantown, MD (US); Genshe Chen, Germantown, MD (US); Khanh D. Pham, Kirtland AFB, NM (US); Erik Blasch, Rome, NY (US)

(73) Assignee: INTELLIGENT FUSION TECHNOLOGY, INC, Germantown, MD (US)

( * ) Notice: Subject to any disclaimer, the term of this patent is extended or adjusted under 35 U.S.C. 154(b) by 223 days.

(21) Appl. No.: 14/927,428

(22) Filed: Oct. 29, 2015

(65) Prior Publication Data

US 2017/0124758 A1 May 4, 2017

(51) Int. Cl.
*G06T 17/00* (2006.01)
*G06T 19/00* (2011.01)

(52) U.S. Cl.
CPC ............ *G06T 17/00* (2013.01); *G06T 19/006* (2013.01); *G06T 2210/21* (2013.01)

(58) Field of Classification Search
CPC ........ B64G 1/242; B64G 3/00; G06T 19/006; G06T 17/00; G06T 2210/21; G06N 5/003; G06Q 10/047
USPC ....................................................... 345/619
See application file for complete search history.

(56) References Cited

U.S. PATENT DOCUMENTS

| 5,987,363 A | * | 11/1999 | Quan ...................... B64G 3/00 701/13 |
| 9,058,678 B1 | * | 6/2015 | Le Grand ............. G06T 15/005 |
| 2009/0289843 A1 | * | 11/2009 | Jayasinghe ............ G01C 21/20 342/357.66 |

(Continued)

OTHER PUBLICATIONS

Shou, H. et al., "Orbit propagation and determination of low earth orbit satellites," International Journal of Antennas and Propagation, 2014, vol. 2014.

(Continued)

*Primary Examiner* — Gregory J Tryder
*Assistant Examiner* — Kwang Lee
(74) *Attorney, Agent, or Firm* — Anova Law Group, PLLC

(57) ABSTRACT

Method and system for predicting collision probability of space objects are provided. Space objects are allocated according to a total number thereof for parallel computation in a GPU device. Initial orbit states of the space objects are generated by an initial-orbit-state generation kernel of the GPU device. Orbit propagation for each space object is performed based on the initial orbit state to predict a state of each space object by an orbit propagation kernel of the GPU device. The predicted states of the space objects are collected by a predicted-orbit-state collection kernel of the GPU device. A real-time visualization and rendering of the predicted space objects are performed in a form of point cloud during interactions between CPU threads and GPU kernels. A CPU host predicts a collision probability of any two space objects among the multitude of space objects, according to the interactions between the CPU threads and the GPU kernels.

20 Claims, 5 Drawing Sheets

(56) References Cited

U.S. PATENT DOCUMENTS

2012/0150573 A1\* 6/2012 Soubra .................. G06Q 10/06
705/7.11

OTHER PUBLICATIONS

Jia, B. et al., "Sparse Gauss-Hermite Quadrature Filter with an Application to Spacecraft Attitude Estimation," Journal of Guidance, Control, and Dynamics, vol. 34, No. 2, Mar.-Apr. 2011, pp. 367-379.
Jones, B. A., et al, "Nonlinear Propagation of Orbit Uncertainty Using Non-Intrusive Polynomial Chaos," Journal of Guidance, Control, and Dynamics, vol. 36, No. 2, pp. 415-425, 2013.
Jia, B. et al., "Stochastic collocation method for uncertainty propagation," AIAA Guidance, Navigation and Control Conference, Minneapolis, Minnesota, Aug. 13-16, 2012.
Nevels, M. et al., "Sparse grid-based orbit uncertainty propagation," AAS/AIAA Astrodynamics Specialist Conference, Girdwod, Alaska, Jul. 31-Aug. 4, 2011.
Park, R. et al., "Nonlinear mapping of Gaussian statistics: theory and applications to spacecraft trajectory designs," Journal of Guidance, Control, and Dynamics, vol. 29, No. 6, 2006, pp. 1367-1375.
Guo, D. et al., "Quasi-Monte Carlo Filtering in Nonlinear Dynamic Systems," IEEE Transactions on Signal Processing, vol. 54, No. 6, Jun. 2006, pp. 2087-2098.

\* cited by examiner

Computation Unit ID = blockDim.x*blockIdx.x + threadIdx.x

METHOD AND SYSTEM FOR PREDICTING COLLISION PROBABILITY OF SPACE OBJECTS VIA GRAPHICS PROCESSING UNIT

GOVERNMENT RIGHTS

This invention was made with Government support under Contract No. FA9453-14-M-0161, awarded by the United States Air Force Research Laboratory. The U.S. Government has certain rights in this invention.

FIELD OF THE DISCLOSURE

The present disclosure generally relates to the field of prediction of space objects and, more particularly, relates to methods and systems for predicting collision probability of space objects via graphics processing unit.

BACKGROUND

The Joint Space Operations Center (JSpOC) under U.S. Strategic Command may track up to about 17,000 space objects having diameters greater than 10 cm. With increasing population of space objects, the collision probability between different space objects increases. Ideally, the potential collision of space objects should be predicted in advance in order to guide related space objects maneuver to avoid collision.

To accurately calculate the collision probability and determine the potential collision threats, the status, such as the position, of space objects should be preciously obtained. Unfortunately, due to various perturbations, such as terrestrial gravity, atmospheric drag, multi-body gravitation, solar radiation pressure, tides and spacecraft thrusters, which can affect space object locations. Thus, it is difficult to determine the accurate status of space objects.

The Monte Carlo based algorithm is the benchmark algorithm often used to demonstrate effectiveness of various algorithms for orbit prediction. The Monte Carlo algorithm, however, is rarely used, mainly because it is computational intensive. A Quasi-Monte Carlo (QMC) method is one of the Monte Carlo based algorithms, which is easy to implement and is widely used for collision probability prediction. However, a large number of samples are required to achieve high prediction accuracy.

Thus, there is a need to overcome these and other problems of the prior art and to provide method and system for predicting collision probability of space objects.

BRIEF SUMMARY OF THE DISCLOSURE

One aspect or embodiment of the present disclosure includes a method for predicting a collision probability of space objects by allocating a large number of space objects according to a total number of space objects for parallel computation in a graphics processing unit (GPU) device. Initial orbit states of the multitude of space objects are generated by an initial-orbit-state generation kernel of the GPU device. Orbit propagation for each space object is performed based on the initial orbit state to predict a state of each space object by an orbit propagation kernel of the GPU device. The predicted states of the multitude of space objects are collected by a predicted-orbit-state collection kernel of the GPU device. A real-time visualization and rendering of the predicted space objects are performed in a form of point cloud during interactions between central processing unit (CPU) threads and GPU kernels. A CPU host predicts a collision probability of any two space objects among the multitude of space objects, according to the interactions between the CPU threads and the GPU kernels.

Optionally, the method further includes displaying a position of the space objects corresponding to the predicted collision probability through Open Graphics Library (OpenGL) associated with the GPU device.

Optionally, prior to the step of allocating a plurality of space objects, an input file containing: initial orbit parameters of the multitude of space objects and the prediction time of each space object, is created.

Optionally, the initial orbit parameters of the multitude of space objects are provided by the CPU host, and transferred from the CPU host to the GPU device, for the GPU device to generate the initial orbit states according to the initial orbit parameters.

Optionally, the input file includes an xml file to enable real time system configuration. The xml file includes initial parameters such as positions and velocities of the multitude of space objects.

Optionally, a graphical user interface (GUI) is used for observing and monitoring the predicted states of the multitude of space objects in real-time during the orbit propagation.

Optionally, the orbit propagation kernel is configured to have one thread integrated with one predicted state of the space object at a time instant.

Optionally, when launching the orbit propagation kernel, the number of threads per block is consistent with an available shared memory of the GPU device.

Optionally, computation of a tile is arranged, such that interactions in each row are evaluated in a sequential order, while separate rows are evaluated in parallel in the GPU device.

Optionally, the step of predicting a collision probability further includes calculating a minimum distance between any two space objects of interest in real-time.

Optionally, the step of predicting a collision probability further includes calculating a ratio between the number of neighboring resident space objects (RSOs) of two space objects and the total number of the RSOs of the space objects.

Optionally, the point cloud propagated by the GPU device is asynchronously transmitted from the GPU device to the CPU host to reduce or eliminate a synchronization time, and the CPU host requests the GPU device for data transmission.

Optionally, updating the predicted states of the multitude of space objects via the orbit propagation kernel is in an online manner or in a real-time manner.

Optionally, the real-time visualization and rendering of the predicted space objects use highly parallel algorithms to achieve a real-time performance.

Optionally, the multitude of space objects includes orbit satellites.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
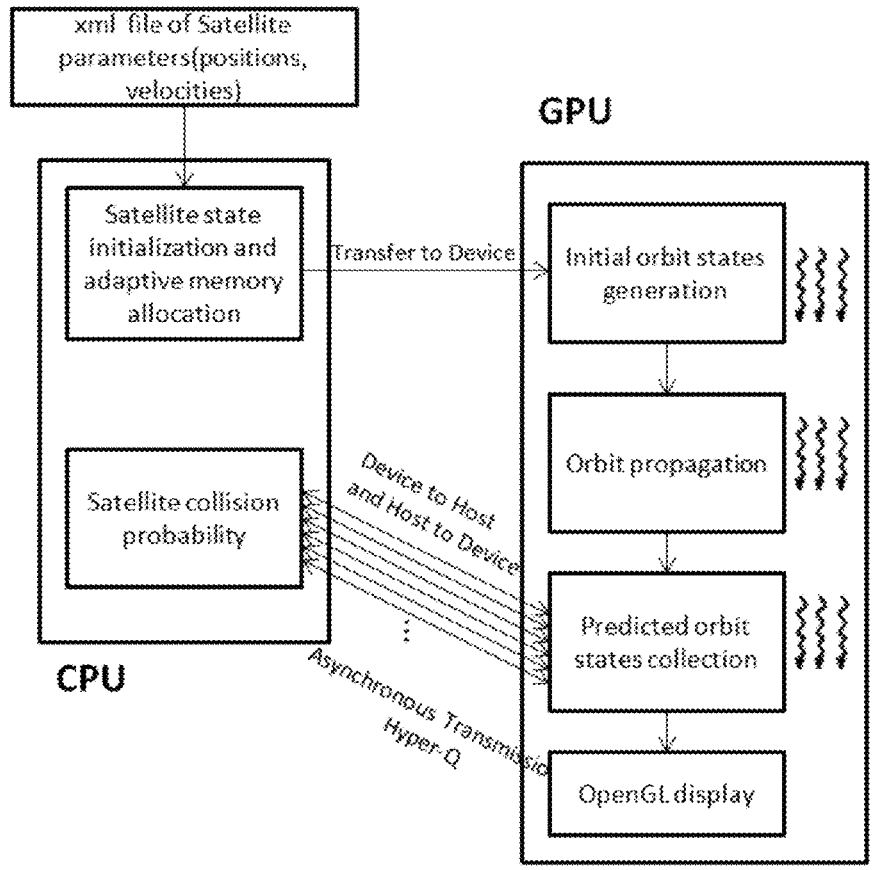
FIG. 1 depicts an exemplary method for predicting collision probability of space objects in accordance with various embodiments of present disclosure.

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced. These embodiments are described in sufficient detail to enable those skilled in the art to practice the disclosure and it is to be understood that other embodiments may be utilized and that changes may be made without departing from the scope of the disclosure. The following description is, therefore, merely exemplary.

The present disclosure provides asynchronous GPU-CPU coupled collision probability computation of space objects. For example, potential collision among a large number of space objects, such as orbit satellites, may be monitored based on asynchronous exchange information between a GPU and CPU and adaptive parallel computing implementation on GPU.

For example, propagating or predicting of multiple satellites may be performed within the framework of a Compute Unified Device Architecture (CUDA) based parallel computing infrastructure for the application of collision detection and monitoring. The disclosed method and system may innovate an operator-friendly GUI for observing and monitoring the orbit propagation result (e.g., in a form of point cloud) in real-time. The disclosed parallel computing based approach has a general purpose in the sense that the same idea can be applied and extended to other types of methods, such as Stochastic Collocation.

It is shown that the application of parallel computing structure based on CUDA Basic Linear Algebra Subroutines (cuBLAS) leading to a real-time outcome of visualization and rendering compared with situations when the visualization work flow is applied in CPU. Moreover, the obtained propagation results for the multiple satellites may indicate that the parallel-based approach provides dramatically improved, speed-up performance in real-time and under realistic conditions.

Disclosed herein provides a method for predicting a collision probability among a multitude of space objects with substantial real-time prediction for collision probability for a large scale space objects based on GPU-CPU coupled parallel computing framework. A QMC method is used and the individual space objects are allocated in different threads adaptively in GPU for the parallel computing, which includes generation of the Gaussian random numbers, for example, using curandGenerateNormal, and the propagation of the space object and the collision probability prediction in parallel implementation using the GPU. In addition, the results of the collision probability are reported and the possible position of space objects is visualized through OpenGL. The application programming interface (API) is used to interact with GPU, to achieve hardware-accelerated rendering.

A GPU is a processor attached to a graphic card for floating point operations. A graphics accelerator incorporates custom microchips which contain special mathematical operations commonly used in graphic rendering. Graphic rendering is a process of generating an image from a two-dimensional (2D) or 3D model or from any models that are collectively named as a scene file, by means of computer programs. The result produced from such model can be named as rendering. The efficiency of the microchips, therefore, determines the effectiveness of the graphics accelerator.

The device GPU implements a number of graphics primitive operations much faster than the host CPU. Many of them feature a linear time complexity in the number of pixels. Thus, they are particularly well-suited for real-time point computation. Parallel GPUs may make computational inroads against the CPU as a subfield of research called General Purpose Computing on GPU.

CUDA® is a parallel computing platform and programming model invented by NVIDIA. It enables dramatic increases in computing performance by harnessing the power of the GPU.

The CUDA platform is the most widely adopted programming model for GPU computing, with Open Computing Language (OpenCL) also being offered as an open standard. OpenCL is a framework for writing programs which execute across heterogeneous platforms including CPUs, GPUs, Digital Signal Processors (DSPs), Field-Programmable Gate Arrays (FPGAs) and other processors.

A GPU is usually treated as a parallel computer with shared memory architecture. As all processors of the GPU can share data within a global memory space, which perfectly fits the data parallelism. However, because of its applied shared memory model, the major bottleneck is memory communication between the host (e.g., CPU) and device (e.g., GPU). As such, unnecessary data transfer between host and device should be avoided as much as possible. In other words, most of the data computation should take place in GPU without interruption. Since data sharing between GPU cores is time-consuming, the data throughput requirement makes current GPUs inappropriate for solving a bunch of small array operation problems. Two principle rules of GPU programming should be followed: 1) to parallelize a large number of scalar/vector addition/multiplications if possible, and 2) to reduce communications between host and devices as much as possible.

In the present disclosure, asynchronous transmission based on Hyper-Q is implemented in the system to reduce the communications between the host and the device.

Multiprocessor (MP) model used in CUDA is called single-instruction multiple-thread (SIMT). In SIMT, MP allocates each thread to one scalar processor (SP) core, and each thread operates independently with its own instruction address and register state. The concurrent threads per MP are created, managed and executed in hardware with no scheduling overhead.

Threads may form the structure of blocks and grids logically. A grid is a set of blocks, while a block is a set of threads. The block and grid sizes are programmatically controlled according to the load of the computation. The optimization of the GPU execution relies on the parameters configuration. The first parameter is the grid size which defines the number of blocks per grid and the second parameter is the block size which defines the number of threads per block. From the general programming guideline of NVIDIA, the key factor of the configuration is to keep the entire GPU busy. The number of blocks in a grid is supposed to be greater than the number of multiprocessors (MPs) so that all MPs have at least one block to execute, and all the active running blocks per MP may keep the hardware busy and thus the system bypasses the relatively time-consuming thread synchronization.

For inevitable communication between CPU and GPU of the system, Hyper-Q is implemented in the disclosed system. Hyper-Q enables multiple CPU threads or processes to launch work simultaneously on a single GPU, thereby dramatically increasing GPU utilization and slashing CPU idle times. This simultaneity feature increases the total number of "connections" between the host CPU and the device GPU by allowing 32 simultaneous, hardware-managed connections (e.g., see FIG. 1), compared to the single connection available with GPUs without Hyper-Q.

For visualization and rendering of the space object propagation, OpenGL is a set of standards for high-performance processing of 2D and 3D graphics on GPU for a wide variety of applications. OpenGL provides fast rendering for preview (Fast Draft mode). OpenGL enables GPU to provide acceleration to display certain interface elements, and for ray-traced 3D rendering.

For a space object whose orbit has been determined from the past observations, the future state of this space object can be predicted by orbital mechanics. However, it is impossible to determine the exact or more accurate status of the space object due to various perturbations in the space. To predict more accurate states of the space object, a large number of representing points in the modeling are generated based on the given parameters of space objects. Then each possible state of the space object may be propagated following the orbital mechanics. The collision probability among space objects thus can be predicted. The QMC method is used to randomly generate random samples or random points to represent the initial possible state of the space object. Without loss of generality, the possible states of the space object are assumed to follow Gaussian distribution, which can be described by the mean and covariance. Under this assumption, the possible initial state of the space object $x^{(i)}$ can be obtained via the QMC method.

For example, a number N of random points $\epsilon^{(i)}$ according to the standard Gaussian distribution may be generated. Then a linear transformation is applied to obtain $x^{(i)}$, which corresponds to a general Gaussian distribution. The points $\epsilon^{(i)}$ using the QMC method are generated as random numbers drawn from the standard Gaussian distribution. Given a set of N initial possible states (samples) of the space objects, the states of the space object are updated via orbit propagation.

FIG. 1 depicts an exemplary method for predicting collision probability of space objects in accordance with various embodiments of present disclosure.

As shown in FIG. 1, an .xml based configuration file, which includes all the initial parameters of space objects, is used to provide the information required for predicting the space objects in future. The xml file includes the initial positions and velocities of the space objects, such as satellites, in the form of matrices. For instance, if there are N=500 satellites, the initial matrix is 500*6. In other words, 6 dimension vectors including initialized positions and velocities of the RSOs are loaded. RSOs may often include a satellite or space junk, orbiting the earth. Thus it can be expected that the xml-based configuration file has high potential to be extended to cloud based or internet based input data.

Rather than writing the data into memory directly, this xml-based structure enables the data retrieval and modification in real-time. According to the number of space objects, the disclosed method and system may allocate the memory space in CPU and GPU adaptively. The adaptive memory allocation is performed from the beginning when the system is turned on till the collision probability is calculated using CUDA. The disclosed method and system may involve updating the states of space object via orbit propagation in an online manner or in a real-time manner. The modification to the number or the initial parameters (e.g., positions and/or velocities) of the satellites is applied easily by manually adding or deleting one line or modifying the numbers accordingly in the xml file. Thus the developed framework and system is designed to be adaptively deal with the situation that different number of space object and different parameters are involved. For example, the device memory is allocated adaptively according to the number of the satellites.

Referring to FIG. 1, a parallel computing infrastructure is utilized to generate initial possible states of space objects and propagate the states of space objects. It can be seen that the parallel implementation of the time-consuming algorithm running in the GPU, dramatically increases the efficiency of the collision probability calculation. The well-known attractive features of parallel computing structure using GPU include on-demand scalability of highly available and reliable computing resources and the hardware designed to rapidly manipulate and alter memory to accelerate the creation of computing units in a frame buffer intended for output to a display.

In an exemplary embodiment, the implementation of Hyper-Q is used to update the states of space objects, which are visualized and rendered through the interaction between Host and Device. Hyper-Q is a flexible solution which allows connections for both CUDA streams and Message Passing Interface (MPI) processes, or even threads from within a process. Existing applications that were previously limited by false dependencies can see a dramatic performance increase without changing any existing code. The Hyper-Q computational kernel and its implementation also uses NVIDIA CUDA programming model. It is also worth to note that CUDA-based visualization and rendering is also a speed-up performance of the system compared with conventional computer graphic visualization method. Both Hyper-Q and the highly parallelized CUDA based visualization and rendering may use non-real-time algorithm to achieve real-time performance. In other words, the processing speed is drastically improved by the asynchronous transmission based on Hyper-Q and parallel implementation based on CUDA.

An example of a GPU suitable for the disclosed method and system is NVIDIA's model Quadro K2000 which has 192 CUDA cores and 1 GB frame buffer. The great number of CUDA cores and desired capacity of frame buffer are the guarantee of the representation of a large number of random possible states for space objects and the long-term propagation of a large number of space objects.

Example: CUDA Based Gaussian Random Numbers Generation

QMC method provides approximate numerical solutions to solve the problems that would be difficult to solve exactly. The defining characteristic of QMC simulation is the use of multiple independent trials, each driven by some random process. The results of all the independent trials are then combined to extract the average answer, relying on the Law of the Large Numbers, which states that as more trials are combined, the average answer will converge on the true answer. The independent trials are naturally parallelizable, and they typically consist of dense numeric operations, so CUDA provide an ideal platform for Monte Carlo based simulations.

The CUDA CUBLAS (CUDA Basic Linear Algebra Subroutines) library provides high performance computing implementation for the Basic Linear Algebra Subprograms (BLAS) level 1 to level 3 operations. Thus, our parallel algorithms are designed to utilize the existing parallel linear algebra library. The flow chart of the GPU implementation on QMC random numbers generation and orbit propagation algorithm is shown in FIG. 1. It is similar to the serial version although it has to send data back and forth between host and device. To fully take advantage of GPU computing power and reduce unnecessary host/device communication overhead, the large size of array/vector multiplication, such as the first-order differential equations, acceleration perturbation modeling and equations modeling of space object motion are conducted on GPU, while the manipulations of relatively small constant computation is left in CPU.

Figure 2:
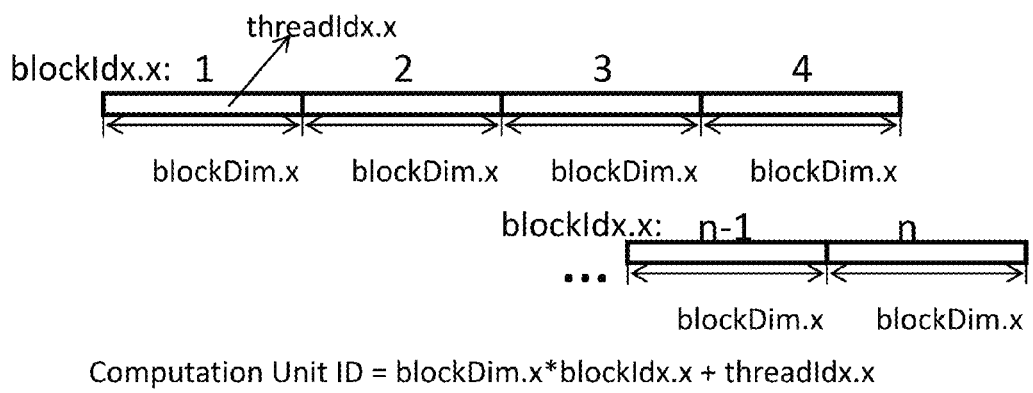
FIG. 2 depicts an exemplary layout of the Thread Block Grid for random numbers generation and orbit propagation parallel algorithm in accordance with various embodiments of present disclosure.

FIG. 2 gives the detail layout of the thread block grid for the random numbers generation and orbit propagation based on separate linear computation. As shown in FIG. 2, an exemplary layout of a grid computation unit in GPU is provided. The multiplication of block numbers and thread numbers represents the number of possible states of the space object while the block number and thread number are set up at the beginning of the memory allocation adaptively.

It is assumed that the initial position and velocity of an Earth-orbiting space object are denoted by $r^I=[x\ y\ z]^T$ and $v^I=[v_x\ v_y\ v_z]^T$ respectively, meaning that six dimensions of random numbers generators are necessary. In other words, for each possible state of the satellite object, six Thread Block Grids are aligned consecutively and performed in the kernel. The memory on device used to save the random numbers will be allocated in advance adaptively. For instance, 10000 possible states of the space object are generated in the memory allocation and partitioned into blocks of threads that execute independently from each other. In one embodiment, the number of blocks and threads are set to be about 50 and 200, respectively. Thus, the memory in GPU is allocated adaptively as cudaMalloc ((void**)&randomnums, (6*threadNumbers*blockNumbers)*sizeof(float)), where randomnums is a vector used to save the random numbers in GPU, threadNumbers and blockNumbers are the number of threads (200 in this case) and number of blocks (50 in this case) respectively. Since the parallel computation in this example is scalar/vector addition/multiplications, the thread index 'threadIdx' is identified using a one-dimensional thread block. The index of a thread and its thread ID relate to each other in a straightforward way: for a one-dimensional block, they are the same, Computation Unit ID=blockDim.x*blockIdx.x+threadIdx.x.

To fully take advantage of the GPU computing power, the generation of random numbers and the orbit propagation are conducted in GPU to reduce the host/device communication overheard. However, there is a limit to the number of threads per block, since all threads of a block are expected to reside on the same processor core and must share the limited memory resources of that core. On current GPUs, a thread block may contain up to 1024 threads. In an exemplary embodiment, for computation convenience, a thread block may include 1000 threads. Also, a kernel can be executed by multiple equally-shaped thread blocks, so that the total number of threads is equal to the number of threads per block times the number of threads per block times the number of blocks.

Figure 3:
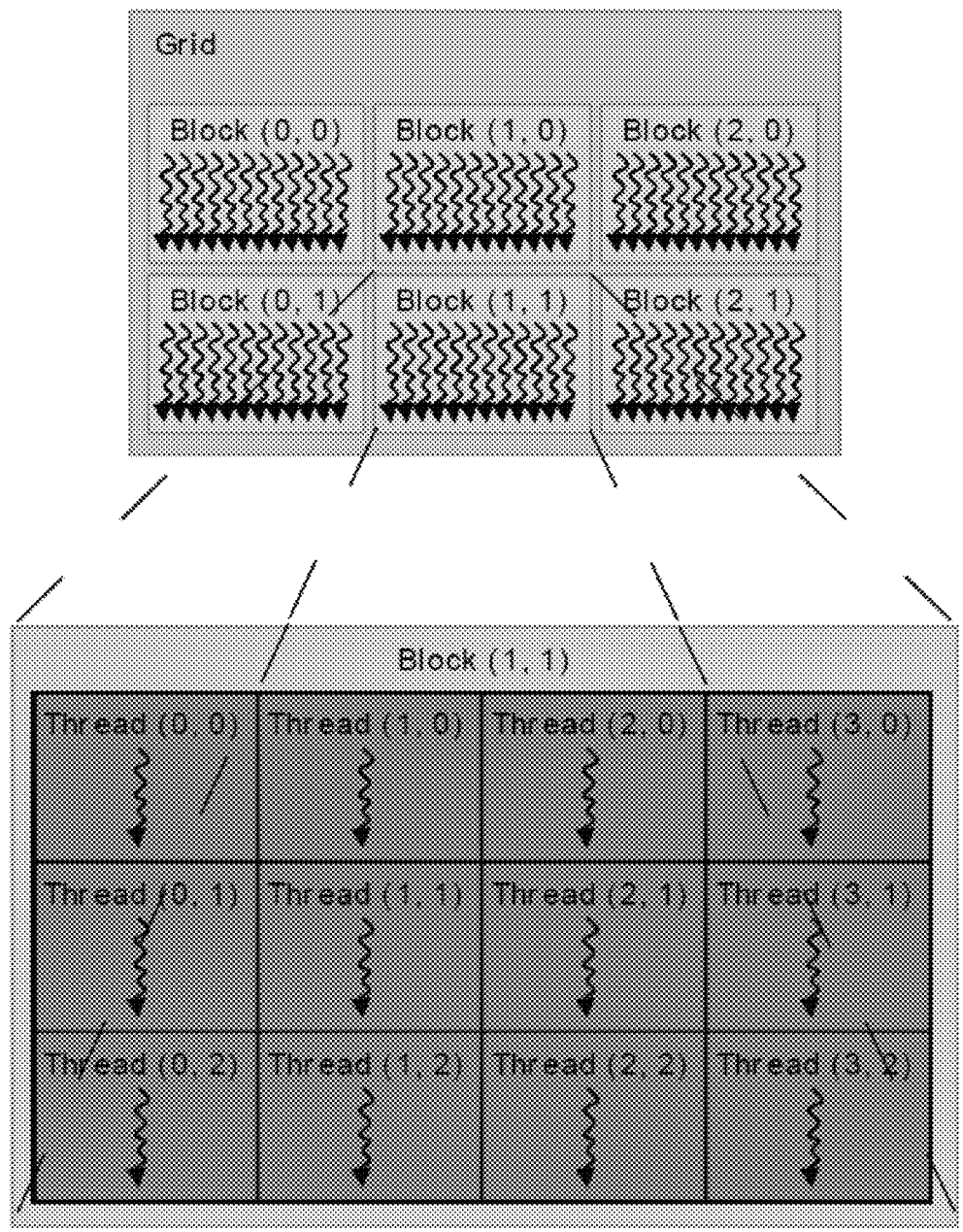
FIG. 3 depicts an exemplary architecture of the Thread Block of multiple Grids in accordance with various embodiments of present disclosure.

Blocks are organized into a one-dimensional or two-dimensional grid of thread blocks as illustrated in FIG. 3. The number of thread blocks in a grid is usually dictated by the size of the data being processed or the number of processors in the system, which it can greatly exceed.

Example: CUDA Based Satellite Orbit Propagation

In Earth orbital space object propagation, the governing equations of the two-body problem with the $J_2$ perturbation are given by equations $\dot{r}=v$ and $$\dot{v} = -\frac{\mu}{r^3} + a_{J_2}.$$

Where r and v denote the position vector and velocity vector, respectively; $a_{J_2}$ is the acceleration due to the Earth's oblateness, given by $$a_{J_2} = -\frac{3}{2}J_2\left(\frac{R_E}{r}\right)^2 \begin{bmatrix} x\left(5\frac{z^2}{r^2}-1\right) \\ y\left(5\frac{z^2}{r^2}-1\right) \\ z\left(5\frac{z^2}{r^2}-3\right) \end{bmatrix},$$

where $R_E$ is the radius of the Earth, $J_2$ is the second degree zonal harmonic coefficient, $r=\|r\|=\sqrt{x^2+y^2+z^2}$, and x, y and z are the component of r. The initial parameters of the two-body problem are given in the space object parameters .xml file as shown in FIG. 1. The xml file contains the initial positions and velocities of the space objects in the form of matrices. For instance, if there are 500 space objects, the initial matrix is 500*6. The above equations are used to propagate the possible states of space objects, which are implemented by the parallel programming using CUDA C++.

In FIG. 1, three exemplary computational kernels include an initial-orbit-state generation kernel, an orbit propagation kernel based on CUBLAS, and a predicted-orbit-state collection kernel. These three computational kernels take most of the numerical computation of the system. The data communications among these three kernels take place in GPU.

Figure 4:
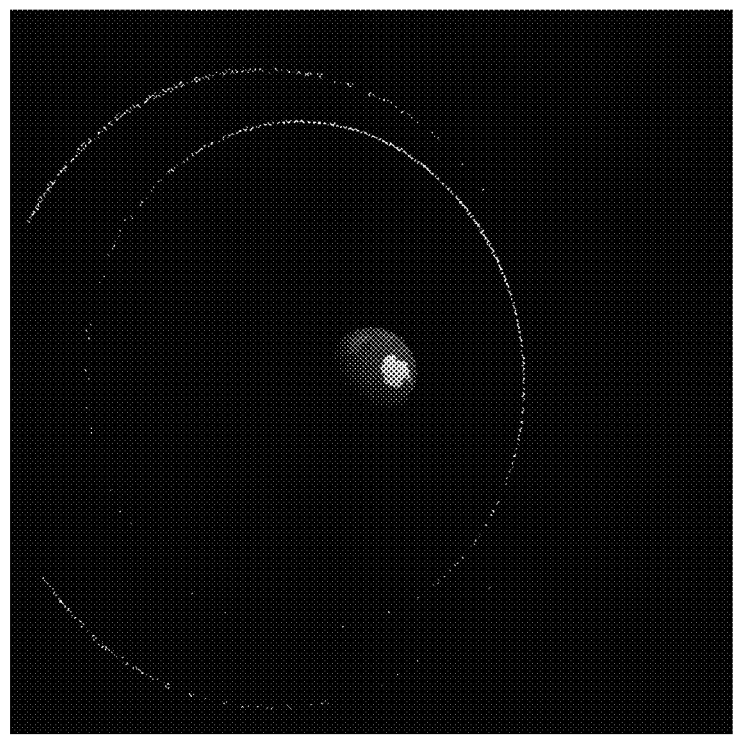
FIG. 4 depicts an visualization and rendering example of possible states of two space objects in accordance with various embodiments of present disclosure.

For example, as illustrated in FIG. 1, the initial orbit states are represented by a large number of possible states, which are randomly generated by initial-orbit-state generation kernel. The generated possible states of space objects in device GPU memory are directly transferred into the orbit propagation kernel for computation using the above-discussed equations. Thus the predicted or propagated positions and velocities of the space objects by the orbit propagation kernel is updated, collected by predicted-orbit-state collection kernel, and then transferred for visualization as point cloud. In other words, the point cloud represents the possible position and velocity of the satellites as can be seen in FIG. 4. The collision probability calculation is performed in CPU based on the possible position and velocity of the satellites generated through GPU, as shown in FIG. 1.

The orbit propagation kernel may be used to have each thread integrate one possible state of the space object at a time instant. In GPUs, each thread copies a possible state of the space object from global or main memory into shared memory and then performs the orbit propagation. Once the possible (or predicted) state of the space object has been updated in time, it is copied back out to global memory and another possible state of the space object is retrieved and stashed in device GPU memory. It is noted that the number of threads in a block increases the device memory. Thus when launching the orbit propagation kernel, the number of threads per block must be consistent with the available shared memory of the device. The optimal launch configuration for the kernel depends on the capability of the device. Based on device Quadro K2000, the launch configuration of blocks number=50, threads number=1000 works well.

Predicting the collision probability of arbitrary two space objects may be approximated by a ratio between the number of the neighboring samples of two space objects and the total number of the samples of the two space objects. In other words, the collision probability is instantly estimated and the possible minimum distance between arbitrary two space objects of interest is calculated in real-time.

Each RSO $X_i(t_0, \chi_i) = [r^T, \dot{r}^T]^T$ is then propagated to some time $t_k$ to yield $X_i(t_k, \chi_i)$. Note that $\chi_i, 1 \leq i \leq N_{QMC}$ denotes the samples. $N_{QMC}$ is the number of samples. 'T' denotes the transpose operation. This procedure is conducted for any number of satellites included in the analysis. Given any two satellites (l=1, 2), the distance of them at $t_k$ is given by $d(t_k, \chi_i, \chi'_i) = \|r_1(t_k, \chi_i) - r_2(t_k, \chi'_i)\|_2$ where $\chi_i \neq \chi'_i$ and $\|\cdot\|_2$ denotes the L2 norm. The instantaneous probability of collision can be calculated by $$P_c(\rho) = \frac{count(d(t_k, \chi_i, \chi'_i) \leq \rho)}{N_{QMC}},$$

where $\rho$ is a predefined value which indicates the collision radius, and the count( ) operator calculates the number of the argument satisfying the constraint over i=1, . . . , $N_{QMC}$.

The computational complexity of collision probability is relatively small, thus this part can be performed in real-time even in CPU.

It is also noted that each batch of work is supposed to be as uniform as possible on each thread. QMC method with adaptive step size is a very uniform process where each thread in a warp is executing the same instruction on GPUs.

Example: CUDA Output Asynchronous Transmission

As known, the threads with less work are forced into redundant operations while waiting for other threads with heavier loads to complete. This situation is called thread divergence and thus the system might be in a jeopardy of device synchronization which seriously degrades the parallel computing performance.

As a rule of thumb and can be seen in FIG. 1, asynchronous data transmission from device to host is implemented and thus the system bypass the relatively time-consuming thread synchronization. Hyper-Q introduces the Grid Management Unit (GMU), which creates multiple hardware work queues to reduce or eliminate the synchronization time. With GMU, streams can be kept as individual pipelines of work.

Figure 6:
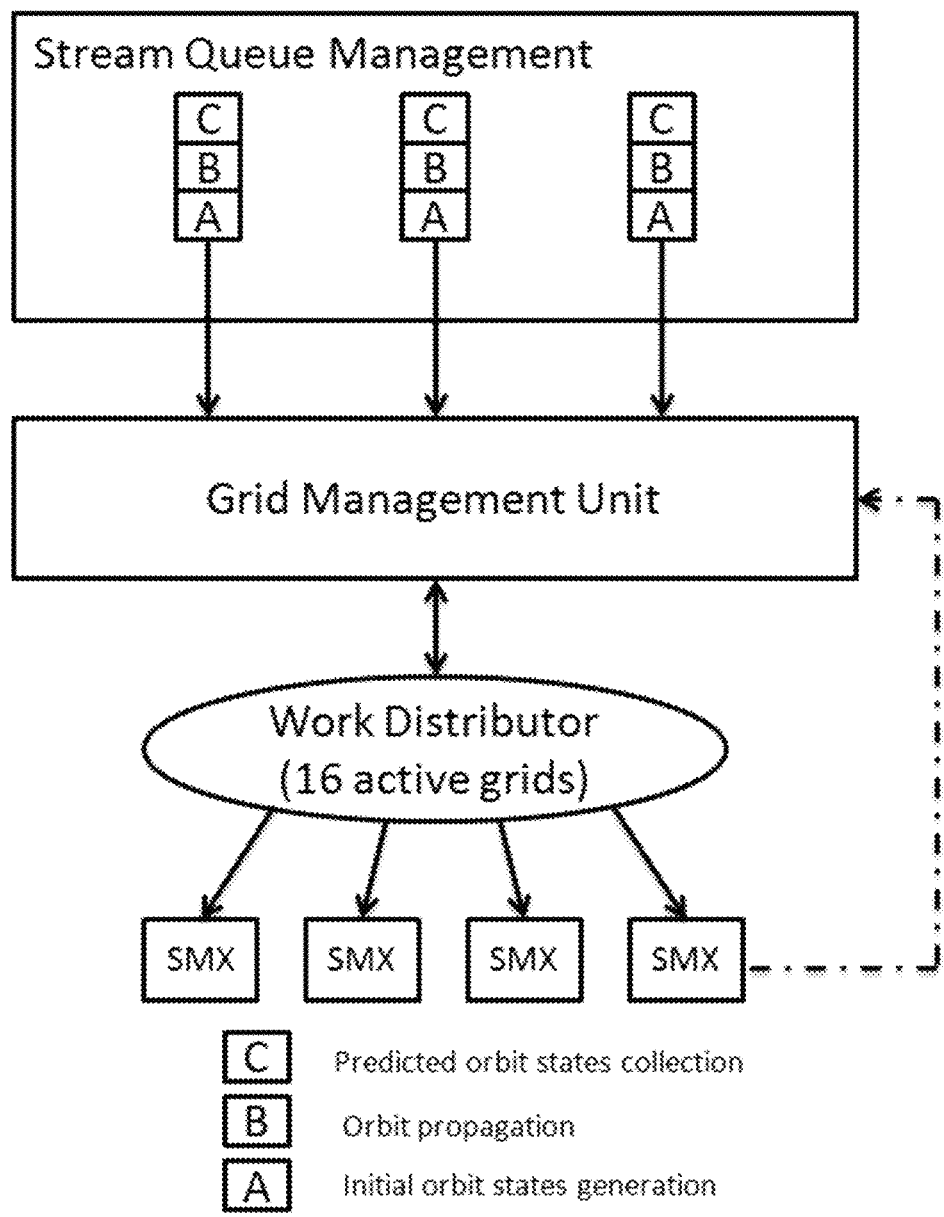
FIG. 6 depicts diagram of an exemplary infrastructure of Hyper-Q in accordance with various embodiments of present disclosure.

FIG. 6 introduces the diagram of the infrastructure of Hyper-Q. GMU is introduced to create multiple hardware work queues to reduce the synchronization time. With the GMU, streams such as orbit propagation and random number generation can be kept as individual pipelines of work.

Figure 7:
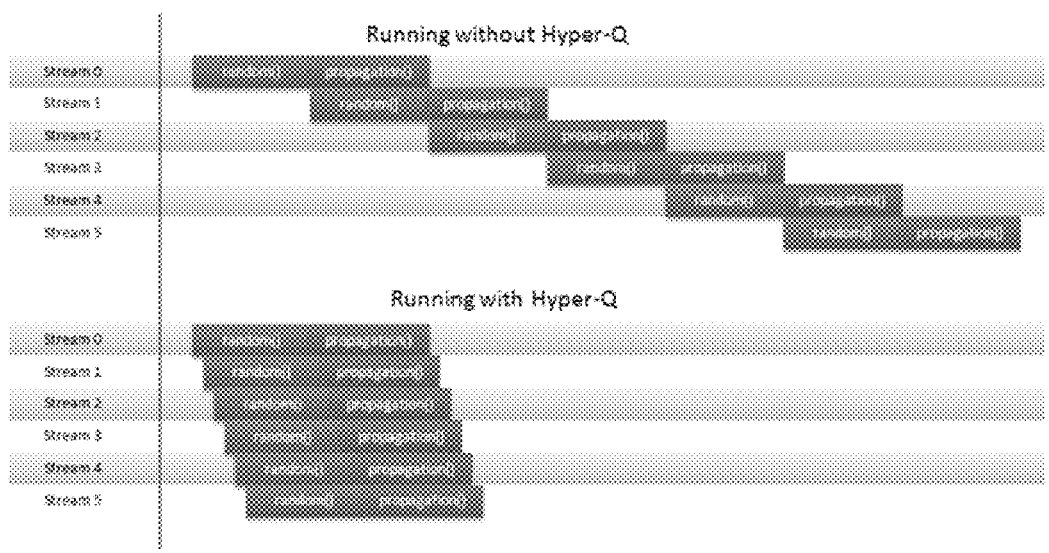
FIG. 7 depicts running time of the devices implemented with and without Hyper-Q.

FIG. 6 also shows the feedback path from the streaming multiprocessors (SMXs) to the Work Distributor and the work creation path from the SMXs to the GMU. In one embodiment, from device to host, the point cloud propagated by GPU is asynchronously transmitted. From host to device, the request for data transmission is sent back to GPU. These components provide dynamic parallelism and CUDA output asynchronous transmission. FIG. 7 shows profile of the running time. As shown, on a device without Hyper-Q, the single work pipeline in hardware means that only concurrency between pairs of orbit propagation kernel propagation from stream n and random number generation kernel random( ) from stream n+1 can be seen. While on a device with Hyper-Q, the synchronization time are eliminated and all kernel random can execute concurrently, as can all the kernel propagation.

CUDA Based Space Objects Visualization

FIG. 4 shows visualization and rendering example of the possible states of two space objects. Each point on the orbit represents a possible or predicted state of the space object. The collision probability calculation requires an N*N grid of all pair-wise operations. Since each pair can be computed independently, there is $O(N^2)$ available parallelism. However, this approach requires $O(N^2)$ memory and would be substantially limited by memory bandwidth. This dilemma was resolved by the introduction of the notion of a computational tile in CUDA. The computational tile is a square region of the grid of pair-wise forces including p rows and p columns. Only 2p body descriptors are required to evaluate all the $p^2$ interactions in the tile (p of which can be reused later). These body descriptions can be stored in device memory or in registers. Theoretically, the total effect of the interactions in the tile on the p bodies is captured as an update to p acceleration vectors.

Figure 5:
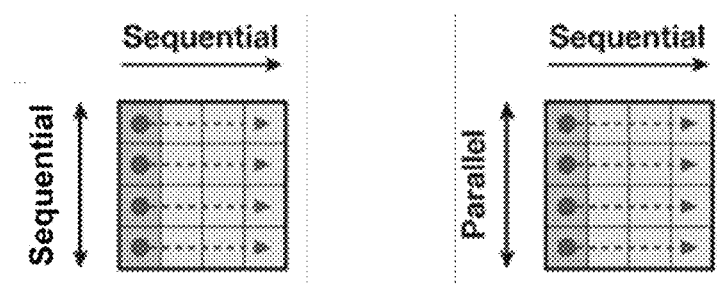
FIG. 5 is a schematic comparing visualization and rendering in CPU on the left hand side with visualization and rendering in GPU on the right hand side in accordance with various embodiments of present disclosure.

To achieve optimal reuse of data, the computation of tile is arranged so that the interactions in each row are evaluated in sequential order, updating the acceleration vector, while the separate rows are evaluated in parallel. As shown in FIG. 5, the schematic on the left hand side shows visualization and rendering in CPU, while the schematic on the right hand side shows visualization and rendering in GPU.

A tile is evaluated by p threads performing the same sequence of operations on different data. Each thread updates the acceleration of one body as a result of its interaction with p other bodies. p body descriptors are loaded from the GPU device memory into the device memory provided to each thread block in the CUDA model. Each thread in the block evaluates p successive interactions. The result of the tile calculation is p updated accelerations. Thus a non-real-time visualization achieves real-time performance based on the application of a parallel computing infrastructure.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. $-1$, $-1.2$, $-1.89$, $-2$, $-2.5$, $-3$, $-10$, $-20$, $-30$, etc.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method for predicting a collision probability of space objects, comprising:
   generating initial vectors of a space object by an initial-orbit-state generation kernel of a GPU device,
      wherein the initial vectors are random vectors, each being a 6-dimension vector [x, y, z, $v_x$, $v_y$, $v_z$] and corresponding to one state of a plurality of states, and the plurality of states representing an overall state of the space object, wherein, in the 6-dimension vector (x, y, z, $v_x$, $v_y$, $v_z$), (x, y, z) represents a position vector and ($v_x$, $v_y$, $v_z$) represents a velocity vector;
   performing an orbit propagation on the initial vectors to provide predicted vectors for the space object by an orbit propagation kernel of the GPU device;
   collecting the predicted vectors of the space object by a predicted-orbit-state collection kernel of the GPU device;
   performing a real-time visualization and rendering of the predicted vectors of the space object in a form of point cloud during interactions between central processing unit (CPU) threads and GPU kernels; and
   predicting, by a CPU host, a collision probability of a first space object and a second space object by calculating a distance between a vector of the first space object and a vector of the second space object, according to the interactions between the CPU threads and the GPU kernels.

2. The method according to claim 1, further comprising:
   prior to generating the initial vectors, creating an input file containing:
   initial orbit parameters, wherein the initial orbit parameters are mean and covariance from Gaussian distribution for generating the initial vectors, and
   a prediction time of each space object.

3. The method according to claim 2, wherein:
   the initial orbit parameters of each space object are provided by the CPU host, and transferred from the CPU host to the GPU device, for the GPU device to generate the initial vectors according to the initial orbit parameters.

4. The method according to claim 1, further comprising:
   using a graphical user interface (GUI) for observing and monitoring the predicted vectors in real-time during the orbit propagation.

5. The method according to claim 1, wherein:
   the orbit propagation kernel is configured to have one thread integrated with one predicted vector of the space object at a time instant.

6. The method according to claim 1, wherein:
   when launching the orbit propagation kernel, the number of threads per block is consistent with an available shared memory of the GPU device.

7. The method according to claim 1, further comprising:
   arranging computation of a tile, such that interactions in each row are evaluated in a sequential order, while separate rows are evaluated in parallel in the GPU device.

8. The method according to claim 1, wherein the step of predicting a collision probability further comprises:
   calculating a minimum distance between the first and second space objects of interest in real-time.

9. The method according to claim 1, wherein the step of predicting a collision probability further comprises:
   calculating a ratio between the number of neighboring vectors including the vector of the first space object and the vector of the second space object and the total number of the vectors of the two space objects.

10. The method according to claim 1, wherein:
    the point cloud propagated by the GPU device is asynchronously transmitted from the GPU device to the CPU host to reduce or eliminate a synchronization time, and
    the CPU host requests the GPU device for data transmission.

11. The method according to claim 1, wherein:
    the real-time visualization and rendering of the predicted vectors use highly parallel algorithms to achieve a real-time performance.

12. The method according to claim 1, wherein:
    the space object includes an orbit satellite.

13. The method according to claim 1, wherein:
    wherein the initial vectors are random vectors generated based on a Gaussian distribution.

14. A system for predicting a collision probability of space objects, comprising:
    a GPU device including GPU kernels, the GPU kernels including:
       an initial-orbit-state generation kernel, for generating initial vectors of a space object, wherein the initial vectors are random vectors, each being a 6-dimension vector [x, y, z, $v_x$, $v_y$, $v_z$] and corresponding to one state of a plurality of states, and the plurality of states representing an overall state of the space object, wherein, in the 6-dimension vector [x, y, z, $v_x$, $v_y$, $v_z$], [x, y, z] represents a position vector and [$v_x$, $v_y$, $v_z$] represents a velocity vector;
an orbit propagation kernel, for performing an orbit propagation on the initial vectors to provide predicted vectors for the space object; and
a predicted-orbit-state collection kernel, for collecting the predicted vectors of the space object; and a central processing unit (CPU) device, wherein:
a real-time visualization and rendering of the predicted vectors of the space object is performed in a form of point cloud during interactions between CPU threads and the GPU kernels; and
a CPU host predicts a collision probability of a first space object and a second space objects by calculating a distance between a vector of the first space object and a vector of the second space object, according to the interactions between the CPU threads and the GPU kernels.

15. The system according to claim 14, wherein:
before initial-orbit-state generation kernel generates the initial vectors, an input file is created and contains:
initial orbit parameters, wherein the initial orbit parameters are mean and covariance from Gaussian distribution for generating the initial vectors, and
a prediction time of each space object.

16. The system according to claim 15, wherein:
the initial orbit parameters of each space object are provided by the CPU host, and transferred from the CPU host to the GPU device, for the GPU device to generate the initial vectors according to the initial orbit parameters.

17. The system according to claim 14, wherein:
a graphical user interface (GUI) is used for observing and monitoring the predicted vectors in real-time during the orbit propagation.

18. The system according to claim 14, wherein:
the orbit propagation kernel is configured to have one thread integrated with one predicted vector of the space object at a time instant.

19. The system according to claim 18, wherein:
the point cloud propagated by the GPU device is asynchronously transmitted from the GPU device to the CPU host to reduce or eliminate a synchronization time, and
the CPU host requests the GPU device for data transmission.

20. The system according to claim 14, wherein:
the real-time visualization and rendering of the predicted vectors use highly parallel algorithms to achieve a real-time performance.

* * * * *